US011232382B2

(12) United States Patent
Palmer, II et al.

(10) Patent No.: US 11,232,382 B2
(45) Date of Patent: Jan. 25, 2022

(54) SYSTEMS AND METHODS FOR PROVIDING AND MANAGING PROACTIVE AND INTELLIGENT COMMUNICATIONS

(71) Applicant: Gravyty Technologies, Inc., Medford, MA (US)

(72) Inventors: Richard M. Palmer, II, Wayland, MA (US); Adam Martel, Boston, MA (US); Nima Abbasighadikolaei, Brookline, MA (US)

(73) Assignee: GRAVYTY TECHNOLOGIES, INC., Wayland, MA (US)

( * ) Notice: Subject to any disclaimer, the term of this patent is extended or adjusted under 35 U.S.C. 154(b) by 271 days.

(21) Appl. No.: 16/159,602

(22) Filed: Oct. 12, 2018

(65) Prior Publication Data

US 2019/0114569 A1  Apr. 18, 2019

Related U.S. Application Data

(60) Provisional application No. 62/571,770, filed on Oct. 12, 2017.

(51) Int. Cl.
*G06Q 30/00* (2012.01)
*G06Q 10/06* (2012.01)
(Continued)

(52) U.S. Cl.
CPC ..... *G06Q 10/06316* (2013.01); *G06F 40/216* (2020.01); *G06F 40/35* (2020.01);
(Continued)

(58) Field of Classification Search
CPC ......... G06N 20/00; G06F 40/35; G06F 40/56; G06F 40/216; G06Q 30/00; G06Q 30/0202; G06Q 30/0279; G06Q 10/06316
See application file for complete search history.

(56) References Cited

U.S. PATENT DOCUMENTS

2005/0065809 A1\* 3/2005 Henze .............. G06Q 10/06393
705/7.39
2008/0114756 A1\* 5/2008 Konig ................... H04L 67/306
(Continued)

FOREIGN PATENT DOCUMENTS

WO   WO-2012116236 A2 \*  8/2012  ............. G06N 5/046

OTHER PUBLICATIONS

Le et al., User-sensitive Scheduling of Home Appliances, http://vuminhle.com/pdf/mobisys13.pdf, Proceeding of the 11th annual international conference on Mobile systems, applications, and services, 2013 (Year: 2013).\*

(Continued)

*Primary Examiner* — Patricia H Munson
*Assistant Examiner* — Uche Byrd
(74) *Attorney, Agent, or Firm* — Barnes & Thornburg LLP

(57) ABSTRACT

Illustrative embodiments provide automated methods and systems for generating customer communications through analysis of known data of the customer, and data derived from third-party systems such as social media platforms and government data sources. Some embodiments provide automated methods and systems that produce, based on past interactions with a customer, a set of future interactions for execution by a sender. The set of future interactions is preferably configured, relative to a previous set of interactions, to increase the likelihood of a favorable response from the customer.

13 Claims, 13 Drawing Sheets

(51) Int. Cl.
*G06F 40/35* (2020.01)
*G06F 40/56* (2020.01)
*G06F 40/216* (2020.01)
*G06N 20/00* (2019.01)
*G06Q 30/02* (2012.01)

(52) U.S. Cl.
CPC ............ *G06F 40/56* (2020.01); *G06N 20/00* (2019.01); *G06Q 30/0202* (2013.01); *G06Q 30/0279* (2013.01)

(56) References Cited

U.S. PATENT DOCUMENTS

| | | | | |
|---|---|---|---|---|
| 2012/0215624 | A1* | 8/2012 | Ramer | G06F 16/9535 705/14.44 |
| 2016/0255037 | A1* | 9/2016 | Spivack | G06Q 10/10 706/12 |
| 2016/0350664 | A1* | 12/2016 | Devarajan | G06Q 50/01 |

OTHER PUBLICATIONS

International Search Report and Written Opinion for PCT/US2018/055747, dated Dec. 27, 2018 (11 pages).
International Preliminary Report on Patentability for Application No. PCT/US2018/055747, dated Apr. 23, 2020 (10 pages).

* cited by examiner

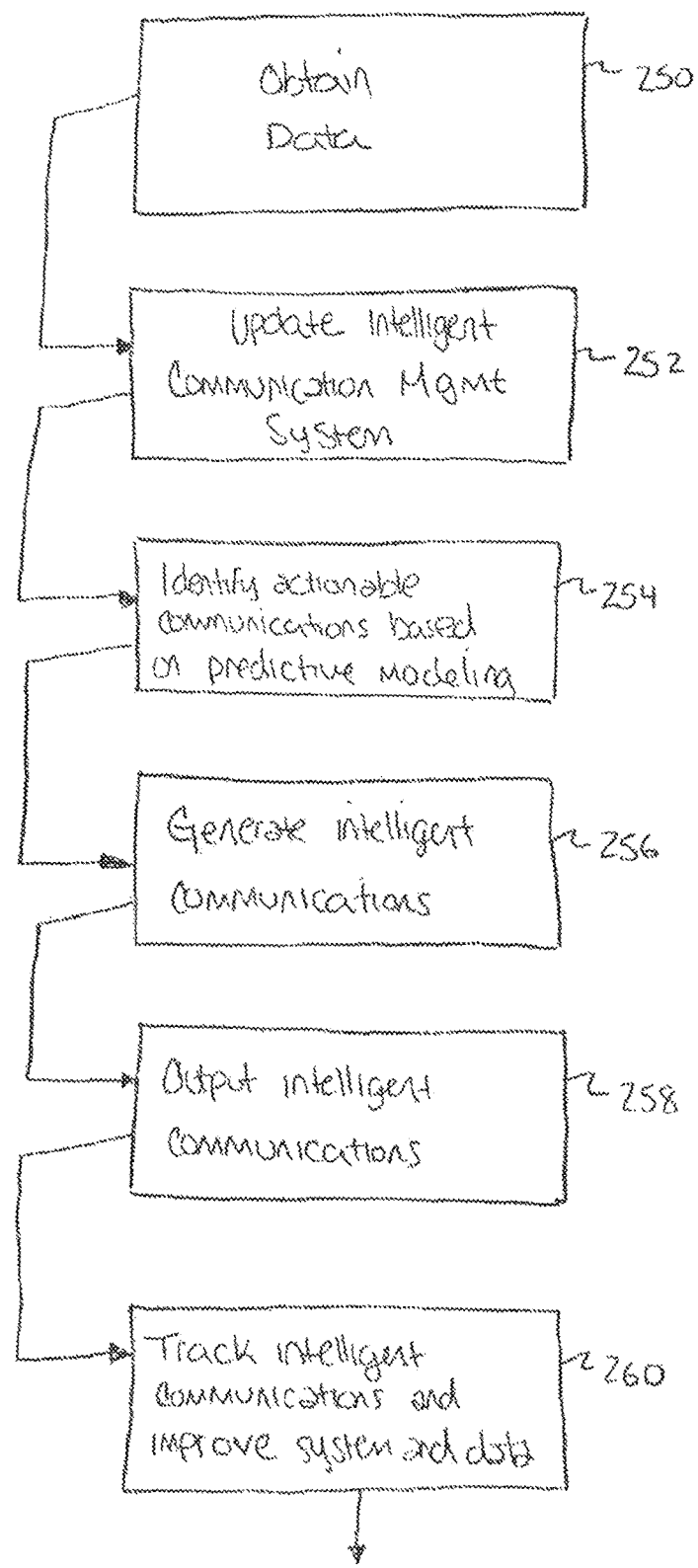

*FIG. 3B*

— First Draft —

Rich Palmer

Adam,

Rich Palmer is a major donor with lifetime giving of $1,200,000. Most recently, on November 10, 2017, Rich made a $290,000 pledge payment to international students funds. His largest gift was $50,000, and his largest pledge was $500,000. Rich is a CTO at Gravyty.

Rich lives in Boston, MA and it might be a great time to set up a visit to ask him to renew his support this year.

Gravyty drafted the below email to Rich on your behalf. If you'd prefer to call Rich, his number is (\*\*\*) \*\*\*-\*\*\*\*.

---

Hello Rich,

My name is Adam Martel and I am the Senior Director of Development for the College of Engineering. I am scheduling meetings with alumni from the College to learn more about their time at (SCHOOL NAME) and to provide several exciting updates. I know you've been a generous supporter of (SCHOOL NAME) and I would enjoying sharing some of the wonderful things happening on campus.

Please let me know if there is a day and time that might work best for us to connect. I have plan to travel to Boston area in the next few months, and would love an opportunity to meet with you in person.

Rich, thank you again for your support and I look forward to talking with you soon.

All the best,
Adam

[ EDIT FIRST DRAFT ]

*FIG. 4D*

Environment

A trained model on the existing data for predicting the probability of closing a gift. This model can be an ensemble model such as Random Forest or Gradient Boosting, or it can be a Neural network depending on the input data (unstructured vs. structured) and the amount of data available Table A, B, C →
← Probability of donation Reinforcement learning Output after processing the sequence and coming up with a Propose actions for the next year

*FIG. 5B*

Email from the user

Deep neural network 1

Classify the sentences into categories that explain the intent of each sentence. Another network extracts information and intent of the whole email/communication.

These systems identify the relation between the context, extracting the unstructured information in the context e.g. past interaction dates, travel plans, etc. and store these unstructured information in structured tables.

This system will also extract information about the grammar usage, the sentence arrangement patterns, punctuation usages, etc.

The details about how these networks are working is presented later in more details.

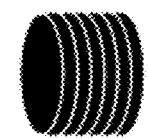

Domain expert language package

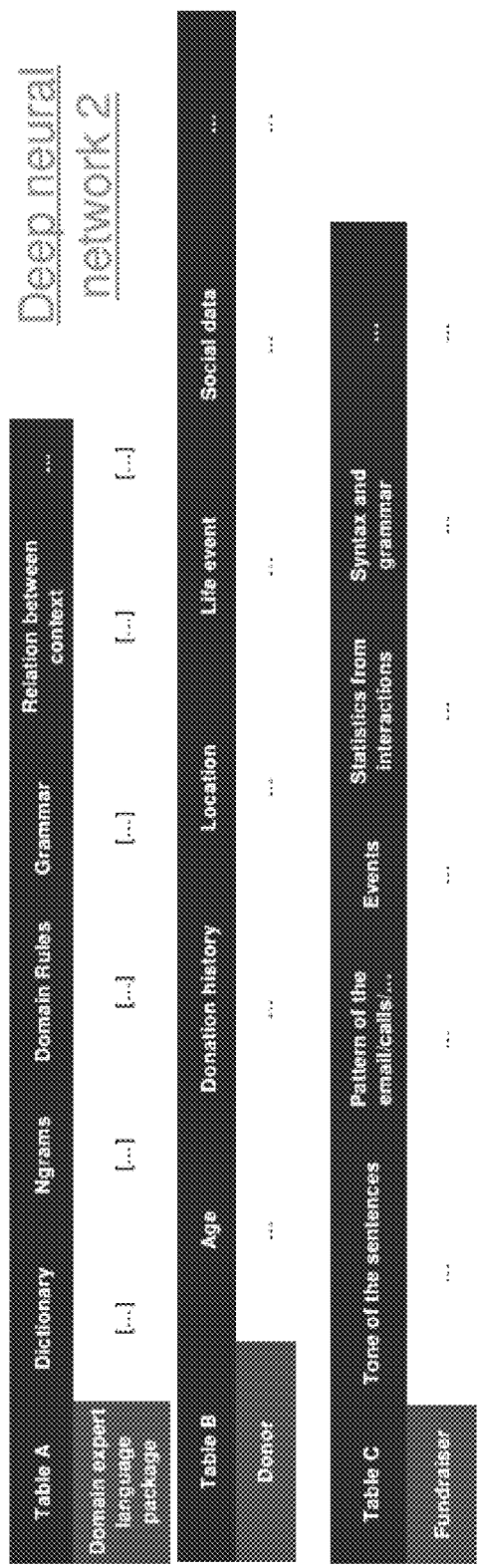

FIG. 5C

Generate/paraphrase text based on the presented information in the table A Using NLP techniques Score these sentences based on the information in table B and C. This step is being done with using the Neural network. Training data is these fields with predicted score with functions and Training process teaches Recurrent Neural Networks(RNN) to score and pick the best matches for crafting the Requested interaction. The information about how these RNN is explained in more detail later.

SYSTEMS AND METHODS FOR PROVIDING AND MANAGING PROACTIVE AND INTELLIGENT COMMUNICATIONS

CROSS-REFERENCE TO RELATED APPLICATION

This application claims priority to U.S. Provisional Patent Application No. 62/571,770 filed Oct. 12, 2017, and entitled "Systems and Methods for Providing and Managing Proactive and Intelligent Communications," which is incorporated by reference herein in its entirety.

FIELD

The present application generally relates to managing communications and more specifically to systems and methods for generating and managing proactive and intelligent communications.

BACKGROUND

Traditional e-mail and other communication platforms allow individuals to communicate with recipients for personal or professional reasons. For instance, customer relationship management (CRM) systems enable entities and/or their members to track actual or potential customers or donors, and communications therewith, with the goal of maintaining and improving relationships with those customers or donors, thereby aiding customer retention and growth. However, these traditional e-mail service providers and communications platforms provided by CRM systems typically require that interactions (e.g., messages, e-mails, and updates) be manually generated and/or personalized, which can be extremely time consuming particularly when faced with a very large number and diverse set of customers or donors. Such manual generation and/or personalization of e-mails thus hinders the message drafter's ability to account for the multitude of factors (e.g., timing, history of interactions, events, data, and so forth) that can impact the success of the interaction.

Moreover, these traditional e-mail and communication platforms can provide auto-generation of messages to customers and donors. Many of these automatic reply techniques however are generic and not personalized. Indeed, some e-mail and communication platforms provide for automatic reply e-mails to be generated that include high-level personalization, such as selecting among reply options based on the sender (e.g., sender's name, e-mail domain) of the received e-mail message. However, these types of personalized e-mail replies, aside from not accounting for the vast amount and diversity of data that can impact the potential success of the message, are reactive rather than proactive. That is, the e-mail account for which an e-mail reply is auto-generated and sent must have first received an e-mail or have otherwise been triggered to prepare the response. To the extent e-mail systems include any sort of "suggestive sentences," they typically require a user to begin typing before the suggestive words and/or rest of the sentence is provided to the user.

There is a need therefore for systems and methods that proactively (rather than reactively) generate and manage communications and interactions (e.g., e-mails) between individuals to optimally achieve the sender's intended goal. Moreover, such systems and methods should be intelligent, meaning that they employ artificial intelligence (AI) algorithms and tools that can analyze and understand relevant data obtained from various private and public data sources, derive information and/or knowledge therefrom, predict (e.g., using predictive models and analyses) optimal communications parameters (e.g., time, substance), and continuously improve their effectiveness via machine learning, deep learning, and reinforcement learning, as provided for herein. In other words, there is a need for communications management systems and methods that provide proactive AI. Indeed, the proactive AI employed by such systems and methods should be verticalized AI, meaning that it can be tailored for particular needs or goals, such as an entity's specific mission or purpose (e.g., profit growth, fundraising), as opposed to horizontal AI, which garners insights across departments, datasets, and use cases within an organization, or standalone AI, which generates its own data and insights independent of other data sources (e.g., third-party sources). Lastly, these systems and methods should be as seamless as possible and reduce the need for multitasking among multiple interfaces, applications and the like, for instance, by providing user interface-less (UI-less) CRM via existing e-mail platforms.

SUMMARY

An illustrative embodiment provides a system for managing intelligent communications. The system includes at least one memory operable to store intelligent communication data and one or more predictive models, and at least one processor. The processor is operable to: receive one or more data sets from one or more partner systems and/or one or more third-party systems; update, based on the received one or more data sets, at least part of one or more of (1) the intelligent communication data, and (2) the one or more predictive models; identify actionable communications based on the one or more predictive models; generate intelligent communications corresponding to each of the identified actionable communications, the generated intelligent communications including messages associated with one or more respective senders and one or more respective recipients; transmit the generated intelligent communications to each of the one or more respective senders; and identify improvement data based on tracking of the generated intelligent communications.

In some embodiments, the system is configured to receive one or more data sets according to a predefined schedule, and in other embodiments the system is configured to receive one or more data sets in response to a request from the system. In some embodiments, the system is configured to receive one or more data sets as a push from the one or more partner systems and/or one or more third-party systems.

In some embodiments, the system is configured to generate intelligent communications based on sentiment analysis. For example, in some embodiments the sentiment analysis is generated by a Naïve Bayes model trained for familiarity.

In illustrative embodiments, the system is configured to update at least part of one or more of (1) the intelligent communication data, and (2) the one or more predictive models by analyzing the one or more data sets by one or more of artificial intelligence, machine learning, deep learning, and/or reinforcement learning.

The system can be further configured to receive from a one of the one or more respective senders, an instruction to transmit a one of the generated intelligent communications, and in response thereto to transmit said one of the generated intelligent communications to a corresponding one of the respective recipients.

Another embodiment provides a computer-implemented method of generating intelligent communications from an entity to a customer of the entity. The method includes the steps of receiving, at a processor, one or more data sets from a partner systems and/or a third-party system; updating, based on the received one or more data sets, at least part of one or more of (1) the intelligent communication data, and (2) the one or more predictive models; identifying actionable communications based on the one or more predictive models; generating intelligent communications corresponding to each of the identified actionable communications, the generated intelligent communications including messages associated with one or more respective senders and one or more respective recipients; and transmitting the generated intelligent communications to each of the one or more respective senders Some embodiments also include identifying improvement data based on tracking of the generated intelligent communications.

Some embodiments include—prior to transmitting the generated intelligent communications to each of the one or more respective senders—receiving, from a one of the respective senders, edits to a one of the generated intelligent communications, and updating said one of the generated intelligent communications accordingly.

In some embodiments, generating intelligent communications corresponding to each of the identified actionable communications includes generating intelligent communications based on sentiment analysis of one or more respective recipients.

Yet another embodiment provides a system for producing a sequence of future interactions between a sender and a customer. The system includes a source of a set of previous interactions with the customer, a neural network data communication with the source of the set of previous interactions, to receive the set of previous interactions from the source, and an interface in data communication with the neural network. The neural network is trained to produce, from the set of previous interactions, a set of future interactions, and the interface provides to the sender the set of future interactions.

In some embodiments, the set of future interactions is biased to elicit a favorable response from the customer, the likelihood of such favorable response being greater than the likelihood of a favorable response produced by the set of previous interactions. For example, in some embodiments, the set of future interactions is biased to elicit a donation from the customer, the likelihood of such donation being greater than a likelihood of eliciting a donation based on the set of previous interactions.

Some embodiments also include a reinforcement learning module logically disposed between the source and the neural network, and in data communication with the source and in data communication with the neural network. The reinforcement learning module can be configured to receive the set of previous interactions from the source and to provide that set of previous interactions (along with information from the fundraiser and donor) to the neural network. Moreover, some embodiments further include an environment module configured to assess the set of future interactions and produce a reward metric, the reward metric having a value indicating a predicted likelihood that the set of future interactions will produce a favorable response (a successful interaction) from the customer, and to provide that reward metric to the reinforcement learning module, and wherein the reinforcement learning module is further configured to update the neural network based on the value of the reward metric. In some embodiments, the reinforcement learning module is further configured to update the neural network based on the value of the reward metric by revising at least one weight within the neural network.

In illustrative embodiments, the set of future interactions comprises a sequence of interactions to be executed in series.

In illustrative embodiments, the sequence of interactions comprises 365 interactions to be executed on 365 consecutive days.

BRIEF DESCRIPTION OF DRAWINGS

This disclosure will be more fully understood from the following detailed description taken in conjunction with the accompanying drawings, in which:

FIG. 2 is a schematic flow chart illustrating one exemplary embodiment of a process for managing and generating intelligent communication;

FIG. 3B is an exemplary email generated by the system and received by the user or client (e.g., sender) in accordance with the source code of FIG. 3A;

FIG. 4D schematically illustrates an embodiment of an environment module in communication with a reinforcement learning module;

FIG. 5B schematically illustrates a process for processing input from a user;

FIG. 5C schematically illustrates a process for generating text; and

DESCRIPTION

Figure 1:
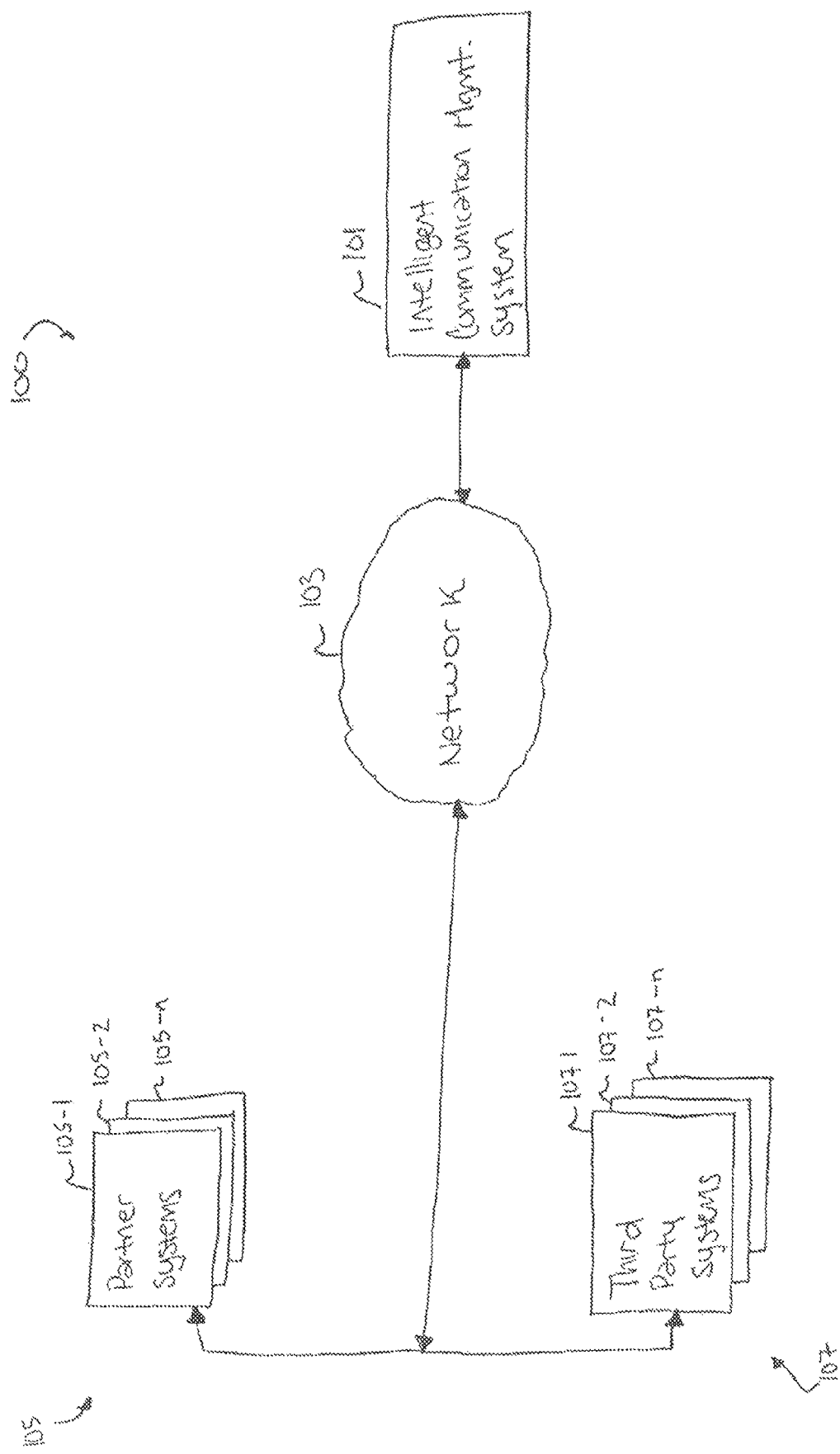
FIG. 1 is a schematic diagram of one exemplary embodiment of an ecosystem in which various systems and methods provided for herein can be operated.

Certain exemplary embodiments will now be described to provide an overall understanding of the principles of the structure, function, manufacture, and use of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present disclosure.

The systems and methods described herein allow for generating and managing intelligent communications. While the systems and methods provided herein can be used in a multitude of ways, some of which are described herein, one application is for providing intelligent communication management on behalf of a fundraising organization. An intelligent management communication system obtains data from various data sources, including a system corresponding to the fundraising organization, other partner systems corresponding to various types of entities, and third-party systems corresponding to public and private entities that collect, store and manage, for example, behavioral data, social feed data, financial information, and the like. The intelligent communication management system collects and analyzes the data, and stores all or part of the data (as well as information inferred or calculated therefrom). For example, the intelligent communication management system can generate and update one or more predictive models that can estimate, among other things, the optimal order or priority for contacting donors or potential donors. Based on this information, the system identifies instances in which communications should be prepared to promote interactions between fundraising individuals and donors. For these identified instances, the system can proactively generate communications that are intelligently tailored based on, among other things, stored data (e.g., obtained data from various data sources and information derived therefrom), using AI techniques known to those of skill in the art and/or otherwise provided for herein. The proactively generated e-mails can be transmitted to the fundraising individual, together with explanatory data, to be sent to the donor in turn. The fundraising individual can, with a minimal number of clicks, edit and send the personalized e-mail. The intelligent communication management system can identify changes made to the personalized e-mail, extract and store useful information from that e-mail, and apply natural language processing (NLP) and deep learning techniques to improve message generation in future cases. In this way, a fundraising individual can seamlessly communicate and manage donors without needing to access various interfaces or applications.

The present system and methods allow for an organization or individual(s) to make long-term communication plans with the people with whom the organization or individual(s) are trying to communicate (i.e., a target). In the present application, the organization is often described as an organization interested in fundraising, and the people with whom the organization or individual(s) are trying to communicate are potential donors, although a person skilled in the art will recognize how to apply the present systems and methods to many different communication models involving senders and receivers. The long-term communication models can be updated dynamically, based on information inputted or otherwise received by the systems. The information upon which it can be updated includes but is not limited to personal or bibliographic information about the target, relevant bibliographic information about other people that are similarly-situated as the target (across one or more types of information, such information including age, employment status, wealth, location, etc.), relevant actual information about the results of previous communications directed to the target, relevant actual information about the results of previous communications directed to other people that are similarly-situated as the target, and relevant information about the environment, which can include, but is not limited to, probabilities of outcomes for various communication types and timings.

Definitions

As used in this description and any appended claims, the following terms shall have the meanings set forth below.

Agent: The agent decides which actions to take from the possible options. For example, in this context the agent is the fundraiser.

Action: Is a set of possible moves or acts that the agent can make. In this model, actions are making phone calls, sending emails, text, etc.

Environment: The space that the agent is interacting with. The environment here is the ensemble algorithm that is providing feedback based on the stages and the existing parameters.

State: The current situation of the agent in the environment is the state.

Reward: This is the feedback that comes from the environment after each action. That is the measure of success or failure for the move.

Policy ($\pi$): The strategy that the agent uses to decide the next action given the current state is the policy.

Value: The "Value" in RL is being defined as the expected long-term return with discount, as opposed to the short-term reward R. Higher discount factors will add some weights to the rewards that are coming in the future vs. lower ones will weight on the rewards that are coming sooner.

Q-Value: This is similar to Value but it takes the current state and action and it will return the long-term effect of this action within this state under policy.

Additional definitions may also be provided for herein, or be otherwise understandable from the present descriptions, in conjunction with the knowledge of a skilled person in the art, and thus failure to list a definition does not mean that a term is not sufficiently defined in the present application.

Intelligent Communication Management System

FIG. 1 illustrates an ecosystem 100 for providing intelligent communication management. As shown in FIG. 1, the ecosystem includes a network 103, via which intelligent communication management system 101, partner systems 105 and third-party systems 107 communicate. The intelligent communication management system 101 is configured to collect, store and process data from the partner systems 105 and third-party systems 107 and, based at least partially thereon, generates and outputs proactive and intelligent communications using predictive modeling, machine learning, deep learning, reinforcement learning, and/or proactive and verticalized artificial intelligence (AI) techniques.

Although illustrated as a single network in FIG. 1, it should be understood that the network 103 can include one or more communication networks the enable communications among the systems of the ecosystem 100. Non-limiting examples of the network 103 include the Internet, a private area network (PAN), a local area network (LAN), a wide area network (WAN), an enterprise private network (EPN), a virtual private network (VPN), and the like. Such communications via the network 103 can be performed using a variety of wired and wireless techniques, standards and protocols, known to those of skill in the art, including Wi-Fi, Bluetooth, and cellular or satellite service.

The partner systems 105 include partner systems 105-1, 105-2, . . . , 105-n, although the partner systems 105 can include one or any number of systems. Each of the partner systems 105 refers to and/or includes a set of communicatively coupled hardware and software corresponding to and/or managed by an entity partnered or associated with the intelligent management entity corresponding to the intelligent communication management system 101. Non-exhaustive examples of such entities can include for-profit, not-for-profit, and/or non-profit entities; private and public corporations; organizations, institutions, universities, partnerships and others known to those of skill in the art.

As discussed above, each of the partner systems 105 includes various hardware components and software tools known to those of skill in the art. An example embodiment in which the partner system 105-1 corresponds to a fundraising organization will now be described in further detail. It should nonetheless be understood that the aspects of fundraising organization partner system 105-1 described below can be applied to or for any type of partner or entity, as known to those of skill in the art.

The partner system 105-1 corresponding to a fundraising organization includes and/or stores, among other things, data associated with one or more of its customers (e.g., donors), fundraising individuals, fundraiser projects, fundraiser beneficiaries (e.g., fund recipients), and a variety of other information relating to the fundraiser organization's practices, as known to those of skill in the art. The data can be stored in one or more servers or databases. In some embodiments, all or a portion of the data stored by the partner system is gated or private, such that it is not publicly accessible externally (e.g., beyond the partner system 105-1 and its associated systems or sub-systems) and/or not accessible to or by particular types of systems or entities. Such data can be gated or made private using a variety of encryption and security algorithms and techniques known to those of skill in the art.

In some embodiments, the partner system 105-1 can include and/or be communicatively coupled to a customer relationship management (CRM) server. That is, the CRM server (or any other server of or corresponding to the partner system 105-1) can be housed by the fundraiser entity or can be a remote or cloud-based system managed by a third-party, such as a CRM or cloud-services entity.

In connection with the customers of the fundraising organization (hereinafter referred to collectively as "donors"), the partner system 105-1 can store a variety of information including at least donor details and corresponding donation information. Non-exhaustive examples of donor data include: donor ID, company name, company ID, birthday, gender, first name, last name, title, position, address, telephone number, e-mail, donation history, communication history, financial data, etc. It should be understood that the donor data can be requested by, collected by, and/or sent to the partner system 105-1. Specific aspects of the donor data are described in further detail below.

The fundraising organization corresponding to the system 101 includes and/or is associated with one or more fundraising individuals that communicate with donors to obtain donations on behalf of the fundraising organization. The fundraising individuals are associated with and/or operate computing devices such as mobile devices, tablets, desktop computers, laptops and other types of computing devices known to those of skill in the art. Using these computing devices, the fundraising individuals can interact and/or exchange data with, for example, donors (or devices corresponding to donors), other components or subsystems of the partner systems 105 (e.g., partner system 105-1), third-party systems 107, and/or the intelligent communication management system 101. In some embodiments, the fundraising individuals use their computing devices to communicate with donors by transmitting, for example, e-mail messages to e-mail addresses or accounts associated with the donors. As described in further detail below, the intelligent communication management system 101 can proactively generate such an e-mail for transmission by a fundraising individual to a donor, the e-mail being personalized based on information stored by the intelligent communication management system 101 including donor and fundraising individual data.

Among the information used by the intelligent communication management system 101 to generate proactive, intelligent and personalized communications (e.g., e-mails) is information received from the third-party systems 107. The third-party systems 107 include third-party systems 107-1, 107-2, . . . , 107-n, although the third-party systems 107 can include one or any number of systems. In some embodiments, each of the third-party systems 107 includes hardware and/or software. For instance, the third-party systems can correspond to entities that receive, produce and/or store user behavioral data, such as social feeds, interactions and the like. Such companies can include social media entities (e.g., Facebook, Twitter), third-party data aggregation service providers (e.g., FullContact, Twillio, and the like, including but not limited to those that do wealth and/or affinity screening). The third-party systems can also or alternatively correspond to entities that receive, produce and/or store public data, such as tax, financial, and geographic data. Such entities can be, for example, government entities such as the Internal Revenue Service (IRS) or other local, state or federal agencies.

The behavioral data can correspond to or be associated with individuals such as customers (e.g., donors of the fundraising organization corresponding to the fundraising organization system 101), members of an entity (e.g., fundraising individuals of the fundraising organization corresponding to the fundraising organization system 101), and others that are actually (e.g. current customers) or prospectively (e.g., potential future customers) associated with the partner systems 105.

As described in further detail below, the information obtained, generated and/or stored by the partner systems 105 and/or the third-party systems 107 is transmitted to the intelligent communication management system 101. Although the intelligent communication management system 101 includes hardware including processors and memory (e.g., servers) to store, among other things, received data, processed or generated data, and/or software logic to employ predictive modeling, deep learning, machine learning, reinforcement learning, and proactive AI techniques to automatically identify, for instance, optimal times at which to contact customers, the ideal or preferred action, and the recommended substance (e.g., text) of the communications to be sent to the customers. In turn, the recommended substance of the communications (e.g., phone, e-mail, text) to be sent to the customers is transmitted (e.g., over the network 103) to the end users of the system, which can include members of a partner entity such as fundraising individuals of a fundraising organization. It should be understood that the end users of the system need not be directly associated with the partner entity, but can instead be temporarily or indirectly (e.g., via another entity or organization) associated therewith, including, for example, volunteers, board members, alumni and the like.

The following figures illustrate example embodiments in which the intelligent communication management system 101 manages communications for a fundraising organization and/or members thereof, to proactively generate and suggest the timing and substance of messages that the members of the organization should send donors or prospective donors. It should be understood however that such example embodiments are presented for illustrative purposes, and that the systems and techniques described in connection therewith can be interchangeably used with or applied to other for-profit or non-profit organizations. For instance, although not described in detail in the following embodiments, the intelligent management system 101 can be used to identify the optimal timing and substance of communications that employees or salespersons (e.g., software salesman) of a company (e.g., technical software distributor) should transmit to potential customers (e.g., businesses or employees thereof).

Intelligent Communication Management Process

FIG. 2 illustrates a flow chart of a process 200 for managing and generating intelligent communications according to an exemplary embodiment. In the illustrated process 200, the intelligent management system 101 manages intelligent communications on behalf of the partner system 105-1, which is a system corresponding to a fundraising organization. At step 250 of FIG. 2, the intelligent communication management system 101 obtains data from systems such as partner systems 105 and/or third-party systems 107. In some embodiments, at step 250, when managing intelligent communications for the fundraising system 105-1, the intelligent management system 101 can obtain data either (1) solely from that partner system 105-1, or (2) from the partner system 105-1 and any other of the partner systems 105 (e.g., 105-2). The system 101 can obtain data from multiple partner systems 105 in order to have access to a more robust and/or complete set of information to perform more accurate predictive modeling (described in further detail below). For instance, if the fundraising organization 105-1 is deemed by the system 101 to obtain incomplete, inaccurate or insufficient data (e.g., based on the data received solely therefrom) about, for example, its donors or their donation, the system 101 can obtain data from other of the partner systems 105 to optimize or complete the information related to the donors or donations associated with the fundraising organization 105-1. It should be understood that, in such cases, data obtained from other of the systems 105 can be anonymized prior to using that information in connection with the partner system 105-1.

Moreover, at step 250, the intelligent communication management system 101 obtains data from the third-party systems 107. As described above, the third-party systems 107 can include systems that store or provide behavioral data, such as a social feed system 107-1 corresponding to a social media company, and systems that store or provide publicly available data, such as a tax information system 107-2 corresponding to the IRS. The data obtained from the third-party systems 107 can be directly associated with or impacting donors, potential donors and/or fundraising individuals of the fundraising organization corresponding to the system 105-1. Although specific examples of the data obtained from the third-party systems 107 can vary and are discussed in further detail below, some examples include comments, likes, retweets, etc. by a donor in connection with the fundraising organization, obtained from the social feed system 107-1; or salary information associated with the donor. As also described in further detail below, the intelligent communication management system can derive (e.g., calculate, predict, interpret, parse) further information based on the data obtained from the third-party systems 107.

Still with reference to step 250, it should be understood that the manner and timing of obtaining the data from the relevant partner systems 105 and/or third-party systems 107 can vary as known to those of skill in the art. First, for example, the data can be requested (e.g., via request commands and responses, pulled, proactively) by the intelligent communication management system 101 from relevant partner systems 105 and/or third-party systems 107; or the data can be pushed by the relevant partner systems 105 and/or third-party systems 107 to the intelligent communication management system 101. It should be understood that different techniques (e.g., push, pull) can be used for different systems 105 and 107, and, in fact, different techniques can be used for the same system 105 or 107 during different instances of obtaining data therefrom.

Moreover, the pulling or pushing of data can be performed at any time deemed optimal to or by the intelligent communication management system 101. Such timing can vary according to the type of data or type of data source systems 105 or 107. The timing can vary between different ones of the systems 105 and 107 and indeed between the same one of the systems 105 and 107 at different instances of obtaining data. In some embodiments, the timing can be set according to a predetermined or predefined scheduled (e.g., hourly, twice a day, daily, every other day, weekly, etc.) or as triggered based on predetermined criteria (e.g., each time data associated with a relevant customer or individual is uploaded to the systems 105 and 107). It should be understood that the data obtained from the systems 105 and 107 at step 202 can be simultaneously or sequentially transmitted to and/or received by the intelligent communication management system 101. In accordance with the present disclosures, communications can be parsed for relevant information. By way of non-limiting example, for purposes of obtaining fundraising information, relevant fundraising information (e.g., spouse name, whether the persons(s) have kids, pan for trips, etc.) can be parsed and that information can be added to a CRM, thereby expanding the database and used for the improvement of the intelligent communication system 101. The information can be gathered, for instance, through the NLP technique of information extraction as provided for herein.

It should be understood that the data obtained at step 250 by the intelligent communication management system 101 can be received directly from the systems 105 and 107, and/or from intermediate systems or servers (e.g., FTP server, an API, etc.) known to those of skill in the art. In some embodiments, data obtained at step 250 can be received and/or retrieved from subsystems of the intelligent communication management system 101 and/or computing devices communicatively coupled thereto. For instance, some data obtained at step 250 can be requested by the intelligent communication management system 101 from fundraising individuals via their respective computing devices. One illustrative example is the intelligent communication management system transmitting questions to an individual and receiving answers therefrom.

In turn, at step 252, the intelligent communication management system 101 is updated by processing the data obtained at step 250. The intelligent communication management system 101, or portions thereof (e.g., individual databases, models, etc.) can be updated periodically (e.g., based on a schedule (e.g., hourly, twice daily, daily, weekly, etc.)), or on an ad-hoc basis as certain events occur (e.g., certain types of data are received, certain amount of data is received). More specifically, processing of the data to update the intelligent communication management system 101 can include, for example, analyzing the data, mapping it to its database, and storing the mapped data. For instance, data received from multiple sources (e.g., fundraising organization system 105-1, third-party systems 107-1 and 107-2) can be analyzed and stored in additional or alternative forms or groupings. As one example, the intelligent communication management system 101 can receive donor details (e.g., age, name, contact information, etc.) associated with a particular donor from the partner system 105-1, social media interaction data from the third-party system 107-1, and financial data from a tax information system (e.g., IRS system) 107-2, and combines relevant portions of that data as deemed appropriate or optimal by the intelligent communication management system 101. Moreover, at step 252, the data obtained at step 250 can be used to update predictive models managed and/or stored by the intelligent communication management system 101. That is, the predictive models can be updated such that the predictions or estimates produced by the models are adjusted or regenerated based on the newly-obtained data. Updating of the predictive models can also include adjusting assumptions, defaults, parameters and other aspects of the predictive models known to those of skill in the art. It should be understood however that updating of the predictive models at step 252 does not necessarily result in changes to the outputs or predictions of the predictive models.

More specifically, the intelligent communication management system 101 includes or stores predictive models that are used to determine recommended or optimal times and manners of communicating with donors (or prospective donors) of the fundraising organization corresponding to the partner system 105-1. It should be understood that the predictive models can have different objectives. For instance, one organization's models can be calibrated to achieve a higher donation amount per donor, while another organization's models can be calibrated to obtain a larger number of donors or faster communication-to-donation time.

In some embodiments, the outputs, estimates or predictions of the predictive models include a score or lead scoring for each of the donors of the fundraising organization associated with the partner system 105-1, calibrated to best achieve the fundraising organization's goals (e.g., higher donation amount per donor, larger number of donors, etc.). The predicted lead scores indicate or imply, among other things, the priority or order for engaging with each of the donors. For example, lead scores can be calculated on a 0 to 100 scale, in which donors to be contacted with more priority have a higher score closer to 100, and donors that need not be contacted with priority have a lower score closer to 0. By considering a variety of data from disparate data sources, the predictive models can estimate lead scores that account for financial, social, behavioral and other types of information about or impacting the donors. In this regard, the intelligent communication management system 101 employs artificial intelligence and machine learning algorithms to improve its predictive models, as explained in further detail below, for example, to derive sentiment information or personalize end user or organizational communication preferences. As one illustrative example, two donors with exactly matching profiles can have different lead scores generated by the predictive models of the fundraising organization if, for instance, one of the donors has been identified as having recently (e.g., within a past hour, day, week, etc.) liked or commented on a pro-fundraising social media post, thereby implying that that donor may have a more favorable donation sentiment at that time based on sentiment analysis or emotion AI algorithms, and thus should be contacted with a higher priority. As provided for further below, in lieu of, or in addition to machine learning, deep learning and reinforcement learning algorithms can be used in a similar manner.

The intelligent communication management system 101 can maintain a single predictive model for multiple partner systems 105, a single predictive model for each of the partner systems 105, and/or multiple predictive models for each of the partner systems 105 (e.g., a predictive model for each individual, group, department, etc.). Maintaining a single predictive model for multiple partner systems 105 allows the predictive model to include a more robust set of data, while using one or more predictive models for each of the partner systems 105 allows the predictive model to be further personalized to achieve the goals of the particular partner entity, group or individual.

Still with reference to step 252, updating of the intelligent communication management system 101 can include updating templates. That is, the intelligent communication management system 101 can store and/or manage communication (e.g., message, e-mail message) templates corresponding to individuals, types or groups of individuals, departments, organizations, partner systems and the like. The template messages can initially be created (and later revised) based on, for example, knowledge or data of the fundraising organization and/or existing e-mails previously sent to donors. For example, the intelligent communication management system 101 can store a default template e-mail message for fundraising individuals of the American Red Cross to send donors or potential donors. The stored template messages can be made up of language that is specific to the organization (American Red Cross), but generally applicable to its fundraising individuals and/or donors, for example. These templates can be updated (e.g., modified, added, deleted) based on the data obtained at step 250. For instance, if the fundraising organization corresponding to the system 105-1 changes the name of a fundraising activity, the template message can be adjusted accordingly to reflect the new name. As described in further detail below, these templates can form the basis for creating more personalized and intelligent templates or messages to be sent, for example, by specific fundraising individuals and/or to specific donors.

Alternatively, step 252 of updating the intelligent communication management system 101 can include providing relational and dynamic sentences through computational and/or statistical linguistics techniques. For example, the system can identify if a sentence does not have a complete meaning by itself and it needs to appear in the text with another sentence to convey a complete meaning and message. This is done by a feature engineering linguistic model that identifies the important features between two or more sentences that makes them to be related or not. These features could be anything from the existence of a word or some more complex concept of a pattern in the part of speech tags or even some conceptual relations. This system gets information from deep learning models that extract information from the intention and information of the sentence to make this decision. A person skilled in the art will recognize that any examples provided for herein that rely on templates can just as easily be implemented using relational and dynamic sentences as provided for herein.

In turn, at step 254, the intelligent communication management system 101 identifies actionable communications associated with the fundraising organization corresponding to the partner system 105-1. In some embodiments, actionable communications can include instances in which the predictive models estimate and output a lead score corresponding to a donor that indicates that a communication should be sent to that donor within a predetermined imminent amount of time (e.g., within the next hour, day, two days, week, etc.). These actionable communications can be identified by analyzing and/or running the relevant predictive models of the system 105-1. In some embodiments, actionable communications can be triggered by specific factors. For example, donors celebrating or having an upcoming birthday can be categorized as having actionable communications associated therewith, meaning that e-mails or other messages should be sent to these donors in connection with their birthdays. It should be understood that messages or communications can be intended to request or trigger a donation, but also to maintain or advance a fundraising individual-donor relationship to increase the likelihood of potential future donations. Other examples of factors or categorizations of donors that can trigger an actionable communication can include recent donors, increase the probability of donation predicted by historical giving, long-lost donors, results of deep reinforcement learning algorithm, and others known to those of skill in the art or derivable from the present disclosures.

Actionable communications can be identified on a periodic (e.g., scheduled), continuous, or ad-hoc basis. For instance, the intelligent communication management system 101 can run its predictive models on a nightly basis to identify actionable communications and, in turn generate (at step 256) and output (at step 258) corresponding communications. Of course, it should be understood that more frequent running and/or analysis of the predictive models, while more computationally complex can also increase the accuracy of the lead score.

More specifically, at step 256, the intelligent communication management system 101 first generates a message corresponding to each of the actionable communications identified at step 254. The messages are formed of text and intended for transmission by e-mail or a similar communication means (e.g., direct messaging platform, text, SMS, etc.). Although, in some embodiments, the text can be generated for and/or output for other transmissions (e.g., audio, speech, etc.). Nonetheless, for the purpose of simplicity, the terms e-mail message, message, text, communication and the like are used interchangeably herein to refer to the message that is generated and output at step 256. As mentioned above, the text of the message can be generated to achieve one or more goals of the respective entity, namely the fundraising organization in the present exemplary embodiment. For example, the message can be intended to foster or advance a potential donor relationship, to obtain a potential donor referral, or to obtain a donation or commitment to donate.

A message is specifically generated for one or more particular fundraising individuals (e.g., senders) and one or more particular donors (e.g., receivers). That is, the intelligent communication system 101 can generate messages specifically for fundraising individual to donor ratios of one to one, one to many, many to one, and many to many. Nonetheless, the messages generated still take into account data and information derived therefrom that is contextually relevant to the interaction between the fundraising individual(s) and donor(s). Moreover, the message is generated based on a template stored by the intelligent communication management system 101. As mentioned above, one or more templates can be stored and managed for a single organization or even for a single fundraising individual of the organization, for instance. Thus, at step 256, to generate the message, an applicable template corresponding to the fundraising individual is selected. In some embodiments, the template can be the template most specific to the fundraising individual or the template determined to be most relevant to the context of the communication (e.g., donation campaign, events, meeting invites, donor, time of year, milestone, etc.). A template can include language that is personalized by the system 101 during the message generation/personalization. Selection of the template and/or personalization of the message based on the template can be performed based on or according to the determinations and/or calculations of or by the predictive models, and applications of the artificial intelligence (AI), machine learning/deep learning language model/deep reinforcement learning and NLP techniques and algorithms of the intelligent communication management system 101.

For instance, in some embodiments, sentiment analysis (or emotion AI) generated by a Naïve Bayes model trained for familiarity and reinforcement learning algorithms can be employed by the intelligent communication management system 101 to select a template from among multiple candidate templates for a fundraising individual's message to a donor. Sentiment analysis algorithms can determine based on, for example, social feed data received from a social media system 107-1 that during the relevant period of time (e.g., present, recent past (e.g., day, week, month)), the donor has shown signs of being motivated by hopeful and positive language or messages (e.g., based on comments, likes, posts, retweets, etc.) and has attended or been receptive to attending charity events (e.g., based on check-ins, searches, event acceptances, past history of interactions between those individuals, etc.). As understood by those of skill in the art, the sentiment analysis algorithms and other AI and machine learning/deep learning/reinforcement learning techniques can employ NLP algorithms to derive meaning from the obtained data (e.g., social feed data). These NLP algorithms can use corpora known to those of skill in the art and deemed optimal in order to extract the most valuable and accurate meaning of the obtained data. Non-exhaustive examples of the such NLP corpora include Stanford's NLTK corpus and the IMDB Movie Review corpus.

In one example embodiment in which the intelligent communication management system 101 determines that the target donor (1) is more likely to respond to positive language, and (2) is receptive to attending charity related events, the intelligent communication management system 101 can identify (or generate) a template. One illustrative example of a high-level template message is as follows:

Hi <name of donor>,

I hope you're having a wonderful week! I work in the <department> here at <organization> and I wanted to find out if you might be free to be my guest for <event>?

I know you've been a generous supporter of our work at <organization> and I'd love to tell you about some of the wonderful things we are doing. Please let me know if there is a day in <date range> that might be convenient for you.

Thank you again for your support and I look forward to seeing you soon! Warmly,

<name of fundraising individual>

As can be seen in the example template, the message has been crafted with positive and hopeful language, and has included an event invitation as the purpose or goal of the message. It should be understood that, while any portion of the message, some higher priority or required variables are indicated by "< >". During the generation of the message in accordance with the template at step 256, the intelligent communication management system 101 can use one or more of predictive modeling and analysis, AI, machine learning, deep learning, reinforcement learning, and/or NLP algorithms and techniques to identify the most optimal language to use and/or values (e.g., smart donation request amounts) to include in each of the variable fields. For instance, the intelligent communication management system 101 can use such techniques in the following exemplary manners:

- To identify the event most likely to be attended by the donor, most relevant to the donor's preferred causes, closest to the donor's location during the date of the event, occurring during a time in which the donor is less occupied.
- To identify smart ask amounts to request from the donor and to most likely achieve the fundraising organization's goals.
- To identify optimal times during which to travel—and the best donors to visit during planned travel.
- To identify the tone of language that donor will be most receptive to.
- To identify the appropriate salutation and manner of referring to the donor (e.g., Mr., Sir, Dr., etc.; first name, last name, etc.).
- To identify the fundraising individual's department and organization.
- To identify the fundraising individual's name and most appropriate manner (e.g., formality) of referring to the fundraising individual.

In some embodiments, templates and messages can be selected based on rules that are preset and/or dynamically determined by the intelligent communication management system 101. Such rules can be applicable to specific fundraising individuals, donors, fundraiser events, organizations, and the like. Non-exhaustive examples of such rules include:

[introductory clause] [variable] [condition], [action]
For example:
Rule=If donor's donations are greater than $10,000 in last month, include more positive/thankful language.
Introductory clause=If
Variable=donor's donation
Condition=greater than $10,000 in last month
Action=include more positive/thankful language In some embodiments, the rules and parts thereof (e.g., variables, conditions, actions, etc.) can be generated and managed by the intelligent communication management system 101. Based on these rules and other determinations performed by the intelligent communication management system 101 as described above, the system 101 finalizes the draft message for the fundraising individual to transmit to the donor. In some cases, the draft is referred to as a "first draft."

It should be understood that, during the message generation of step 256, including the template selection and personalization, the intelligent communication management system 101 can store one or more templates for future use in connection with relevant scenarios. For instance, after the intelligent communication management system 101 personalizes the message using the fundraising individual's preferred manner of referring to the donor, a new and additional template can be saved such that future messages can be based off of the new template if deemed appropriate. These messages can be crafted with consideration of tone and language usage of the fundraiser, and also the specific personality, history, and details of the donor.

As discussed above, at step 256, the intelligent communication management system 101 can generate, and later output (at step 258) messages corresponding to the actionable communications identified at step 254. One non-limiting embodiment of source code that can be operated to perform this step is provided for in FIG. 3A. As illustrated, based on information input into the system (e.g., gifts given, date of gift, foundation to which donation was directed), a communication can be generated. In the present instance, the communication is an e-mail, although other communications (e-mail, telephone call, text message, etc.) are possible. The code generates an introduction (e.g., "Hello"), dynamic sentences, and a closing. In the present example, the introduction is "Hello" with an auto-fill of the point of contact receiving the communication. The generation of those dynamic sentences are provided for in greater detail elsewhere, but the sentences are tailored communications for the recipient based on the factors described herein (e.g., information about the recipient, information about the donation, information about the environment, etc.). In the present example, the closing is "All the best," with an auto-fill of one or more of the signature of the sender (in this instance, a fundraiser) and the name of the sender.

Figure 3A:
FIG. 3A is exemplary source code that can be used to generate e-mails to a user or customer (e.g., sender) based on the systems and methods provided for herein.

An illustrative example of a communication 500 (e.g., an e-mail in this instance) that can be generated from the code provided for in FIG. 3A is provided in FIG. 3B, with the recipient/customer/potential donor being "Rich Palmer" and the sender/fundraiser being "Adam Martel." A top portion 500A of the illustration demonstrates information that is presented to Adam about the user. It notes Rich is a major donor, provides information about the giving he has done (e.g., lifetime giving, most recent pledge, where the most recent pledge was directed, largest gift made, largest pledge made), provides other personal information (e.g., that Rich is a CTO of a company called "Gravyty," he lives in Boston, Mass.), and even suggests an action (e.g., set-up a visit to ask him to renew his support, offers a phone number to call). Of course, additional information can be selectively provided to the sender, with that selection being able to be made on the server side or the sender side, and being able to be automated or selectively programmed as would be understood by a person skilled in the art. For example, the sender may be able to select what information it receives about a potential donor and over what time frame. Alternatively, or additionally, the server can be automated to determine what information is likely to be most useful to the sender and provide that information to the user. Such automation can be based, at least in part, on past interactions with the sender, information that has helped a recipient be more responsive, and/or information about a selected population of recipients that may be informative about the proclivities of the recipient.

A bottom portion 500B of the illustration (the portion below the horizontal line illustrated) is a draft e-mail message provided by the system to the sender. In accordance with the code provided for in FIG. 3A, the opening starts "Hello Rich," and closes with "All the best, Adam", with Rich being the point of contact receiving the communication as the recipient/potential donor, and Adam being the sender/fundraiser. All of the sentences in the middle are generated as dynamic sentences in accordance with the present disclosures. These sentences can be generated in any fashion described in the present application, or otherwise derivable from the present application, including but not limited to the description provided above related to relational and dynamic sentences. The draft message can be editable by the sender prior to sending the message to the recipient. In some embodiments, the draft message is presented to the sender in a complete form ready for sending, and in other embodiments the draft message leaves portions to be completed by the sender. For example, the draft message in FIG. 3B includes two locations at which the sender would add the school name. In doing so, the sender may personalize the draft message by using the school's formal name (e.g., the University of Mississippi), or a more colloquial name (e.g., "Ole Miss"), to provide but one example.

The messages can be generated and/or output as the actionable communications are identified, or based on a different schedule. That is, for instance, the messages can be generated and output each time that the system 101 identifies the actionable communications, such as on a nightly basis. Alternatively, the messages can be generated and output based on other timing criteria. For example, if actionable communications are identified on a weekly basis for a one-week period, then the messages can be generated and output on a nightly basis based on the week's actionable communications identified at step 254. A longer-term action plan or schedule can also be included as part of the system, with that action plan being dynamic. For example, the schedule can be established for a one-year time period, and that schedule can then be updated based on information input into or otherwise received by the system, and information known by the system. The information can be about the recipient, information about people similar to the recipient across one or more criteria, information about an environment, and information about probabilities of success, among other types of information. The information about the recipient and/or people similar to the recipient can be more bibliographic in nature (age, occupation, salary, where they live, friends, colleagues, preferences, etc.) and/or more related to how previous communications have been received by the recipient and/or people similar to the recipient. This allows the communication to be dynamically updated to reflect a more likely positive outcome for the sender.

The deep learning capabilities provided by the present disclosure allow for significantly improved interactions with people (e.g., donors, as provided above). Deep neural networks can categorize the sentences and find the intention of each sentence along with the information and characteristics of the words that are forming the sentence. Words inside the sentences can be replaced based on specific needs to make it more appealing for the sender and receiver. Sentences have their own characteristics, and they have dependencies. They can be related to a time, space, situation, event, travel, history, other sentences in the message, etc. This information is essential for crafting a new message based on the usage of the sender and relevant to the receiver. For example, if a user tends to thank some of the receivers both at the beginning and ending of the message—first the intelligent communication management system 101 identifies those type of receivers and once it learns, it will have those sentences in place for the targeted receivers with words related to them.

Deep reinforcement learning that has been utilized in the process 200 is making decisions about the steps that need to be taken to have a successful communication. Each reinforcement learning algorithm has an environment and the environment of this algorithm here is the feedback that system is getting from the donor and fundraiser. Also, the environment is receiving information from previous interactions and communications, and incorporating the result of those communications to the feedback. The environment is capable of foreseeing the effect of an action in a given state (state in this problem means the set of interactions). The deep reinforcement learning model uses the information from the environment to find the best sequence of actions to get to the best outcome. The usage of deep learning here is the sequence, if one wants to plan fundraising activities for the next year and wants to know in advance what the steps that they should take with a specific prospect the space that the algorithm should predict is (m) days. In each day they have multiple choses for communication (n). Therefore, there would be n to the power of m different options to take and this is the reinforcement learning responsibility to present the best set of actions. Processing a long sequence is faster and more efficient with deep learning and recurrent neural networks (RNNs) to find out the most important parts of the sequence and effect of each day/hour/minute on the final outcome. This system is not purely based on the previous interactions and it gets more information about the content of those past interactions and about the prospect. Additional information about dep reinforcement learning is provided below with respect to FIGS. 4 and 5.

Turning back to FIG. 2, at step 258, the intelligent communication management system 101 transmits the personalized and intelligent message generated at step 256 to the fundraising individual. The personalized message is transmitted together with an explanatory message indicating the logic and/or reasoning behind the generation of the message. In other words, in some examples, the intelligent communication management system 101 sends an e-mail to the fundraising individual including (1) an explanation of the personalized message for the donor, and (2) the personalized message generated at step 256. For example, the explanation can indicate that the message has been generated because the donor has donated over a certain amount of money (e.g., $10,000, $50,000, $100,000, etc.) but has not made any donations in a certain amount of time (e.g., 1 month, 6 months, 1 year), and that the donor has recently been attending other charity events and showing positive attitude toward donations to charitable causes. This explanatory language provides context to the fundraising individual when reading the generated personalized and intelligent message.

The communication sent by the intelligent communication management system 101 to the fundraising individual at step 258 can include a button, link or other selectable command that causes the intelligent message generated at step 256 to be populated in an e-mail window within the fundraising individual's e-mail platform or service provider, along with a relevant subject and the donor's contact information. In this manner, the fundraising individual can in turn send the message to the donor with minimal interaction required (e.g., one or a few clicks).

By virtue of the structure and content of the message sent from the intelligent communication management system 101 to the e-mail account of the fundraising individual, the intelligent communication management system 101 provides a user interface-less (UI-less) database or CRM management system. That is, from the e-mail sent to the fundraising individual, the fundraising individual can manage its donors, which are traditionally stored and managed by and through the platform and interfaces of its system or the fundraising organization's systems. Examples of management of the donor through the e-mail sent to the fundraising individual includes learning about a donor, tracking communications with the donor, and adding/modifying preferences and data associated with the donor and donor communications. By providing such functionality through the e-mail platform or provider of the fundraising individual, the fundraising individual does not have to access or log into its CRM platform (or operate the CRM interface) to view, add, or edit donor related information, but can instead seamlessly and without an additional UI manage its CRM from the same interface as it sends its communications and performs a plethora of other tasks (e.g., messaging, document management, etc.). One example described below at step 260 for editing donor-related information through the e-mail interface is performed by the fundraising individual merely making changes to the draft intelligent e-mail that is then sent to the fundraising individual at step 258.

The e-mail message that is auto-generated for the fundraising individual can also have a unique ID associated therewith and can include an e-mail address, as a blind carbon copy (BCC) recipient, for an account associated with the intelligent communication management system 101. As described below in connection with step 260, the unique ID and/or BCC of the e-mail account of the intelligent communication management system 101 allows the intelligent communication management system 101 to, among other things, track the status and substance of the intelligent message actually delivered to the donor e-mail account, which the intelligent communication management system 101 can later use to update and enhance its systems' accuracy, robustness, effectiveness and efficiency using machine learning, deep learning, reinforcement learning, NLP, and AI techniques, as described below.

Although not illustrated in FIG. 2, the fundraising individual can edit the intelligent message that is received and then populated in a draft e-mail window intended for the donor (see, e.g., FIG. 3B, and the related description above). For instance, the fundraising individual can make changes such as the tone of the language, the manner in which the donor is referred to, introductory language, salutation, greeting, insertion of preferred terms, deletion of unwanted terms, level of detail, capitalizations, and many other attributes and values known to those of skill in the art. Any such changes would be possible in accordance with the example illustrated in FIG. 3B, and in other instances derivable from the present disclosures. The fundraising individual then sends the edited message to the donor's e-mail account. Because the e-mail eventually sent includes as a BCC an e-mail account associated with the intelligent communication management system 101, the intelligent communication management system 101 receives the e-mail sent to the donor and can recognize the identity of the e-mail based on the unique ID included therewith or therein.

At step 260, the intelligent communication management system 101 can analyze the e-mail sent to the donor, and compare it to the corresponding e-mail prepared for and sent to the fundraising individual. Based on this analysis and comparison, the intelligent communication management system 101 can identify the modifications made by the fundraising individual and, using machine learning/deep learning/reinforcement learning and AI algorithms, can update its systems (e.g., rules, models, templates, etc.) such that intelligent communications later generated at step 256 can account for and/or be adapted based on these changes. In some embodiments, step 260 includes a feedback loop, in which outputs (e.g., intelligent first draft message sent to the fundraising individual; message sent to the donor) are received and/or retrieved by the intelligent communication management system 101 for analysis and, based thereon, its systems can be updated. In some embodiments, such updates can include, among other things, storing data, modifying existing data, and causing the recalibration of predictive models.

While in FIG. 2, the process of improving data is illustrated in connection with step 260 which occurs in response to an e-mail sent to the donor being received by the intelligent communication management system 101 (e.g., as a BCC recipient), it should be understood that improving the data of the intelligent communication management system 101 can be performed at any point during the process 200, continuously or periodically, and/or simultaneously with other parts of the process 200. For example, data can be improved as new or revised data is received by the intelligent communication management system 101 from the partner systems 105 and/or the third-party systems 107.

In some embodiments, improving data includes providing data integrity and hygiene. Non-exhaustive examples of improving data include: completing data based on received data or data requested using an e-mail message (e.g., one-click e-mail) as described above; augmenting existing data based on learned preferences, rules, trends, and feedback requested in an e-mail message (e.g., one-click e-mail); and tracking the progression of donors along states or stages using, for examples, rules engines and Markov chains or models.

In some embodiments, the tracking of communications and improvement of data can include investigating instances in which e-mails sent to fundraising individuals were never sent to the donor. In such cases, the intelligent communication management system 101, the system 101 can send a follow-up e-mail to the fundraising individuals to ascertain why the intelligent e-mail was never sent to the donor. In some embodiments, follow-up e-mails can be sent even in cases where the e-mails were indeed sent to the donors, for example, to receive more information about the result of the communication (e.g., whether the donor reached out to the fundraising individual, whether a call, meeting or the like has been scheduled, where there is new information about the individual that should be stored).

Although example embodiments described herein discuss a process for generating and sending a single message in connection with a single fundraising individual and donor, it should be understood that the intelligent communication management system 101 can simultaneously generate and output intelligent messages to one or more fundraising individuals and one or more donors.

Deep Reinforcement Learning and Deep Neural Networks

Figure 4A:
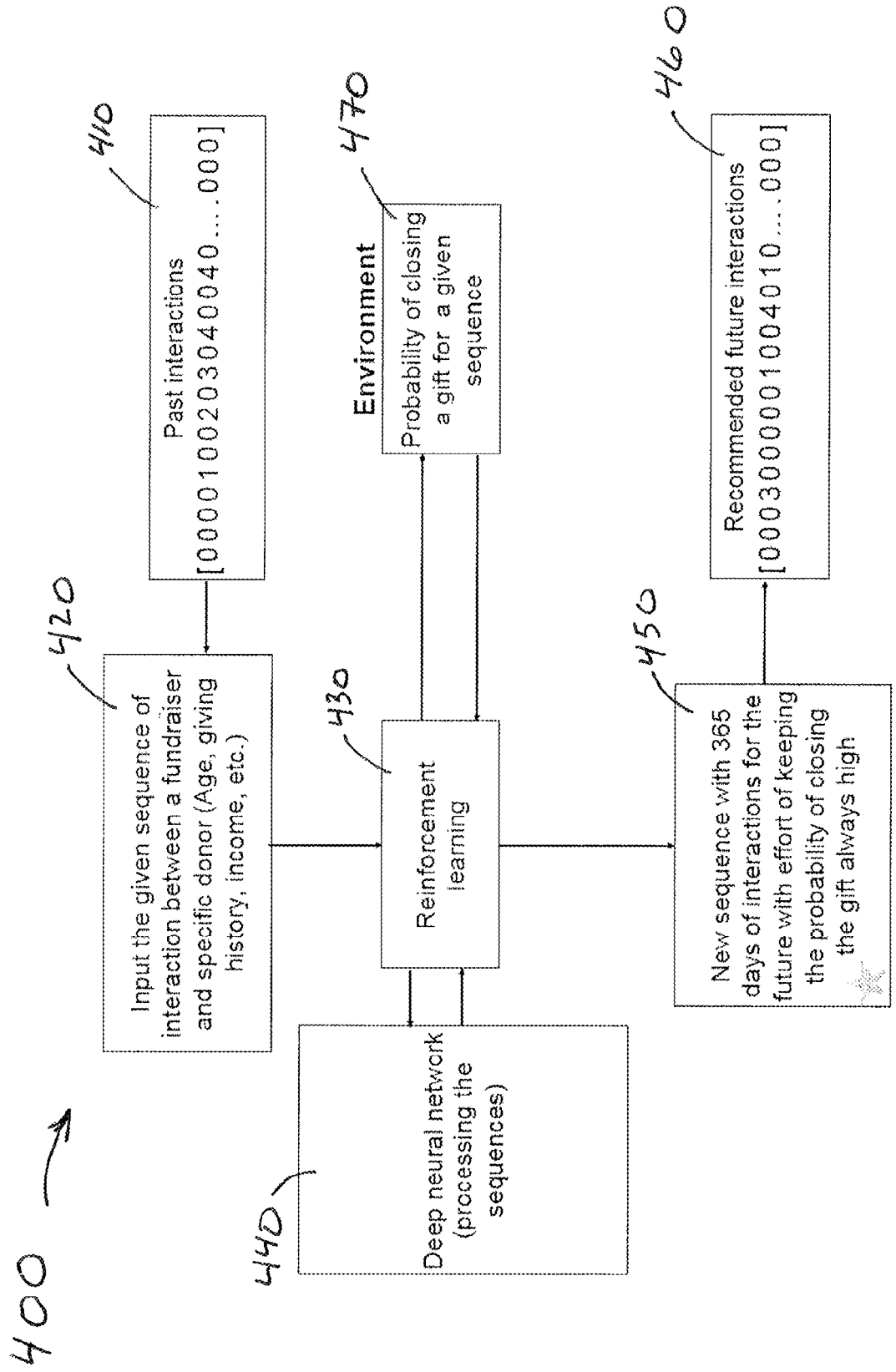
FIG. 4A is a schematic flow chart of one exemplary embodiment of how a reinforcement learning algorithm operates as part of the systems and methods provided for herein.

FIG. 4A schematically illustrates an embodiment of a system 400 for creating a sequence of future interactions between a sender/fundraiser and a recipient/customer (e.g., a potential donor), based on a sequence of previous interactions 410 with that specific customer. The specific customer may be identified, for example, by name, age, giving history, income, e-mail address, phone number, etc. The sequence of previous interactions 410 may therefore be referred to as a "correlated" sequence of previous interactions 410. As shown, a workflow for generating a set of actions for the next upcoming year is provided, although this workflow can be implemented over any period of time. In the illustrated embodiment, the prediction is based on previous fundraiser-donor interactions.

In illustrative embodiments, the correlated sequence of previous interactions 410 includes one interaction per day for a previous period of time. For example, the correlated sequence of previous interactions 410 may include 365 interactions, one interaction for each of the previous 365 days. In the illustrative embodiment of FIG. 4A, each digit represents an interaction for specific day in a sequence of days. For example, in illustrative embodiments, the interactions may be defined by the following table:

| Value | Description of Interaction |
|---|---|
| 0 | No action taken to interact with the customer. In illustrative embodiments, the system or a system user may still monitor incoming communications (e.g., e-mail; letters; phone calls; text messages, etc.) from the customer. |
| 1 | Sender places a phone call to the customer. |
| 2 | Sender sends a letter or e-mail to the customer. |
| 3 | Sender sends a text message to the customer. |
| 4 | Sender has an in-person meeting with the customer. |

In the example of FIG. 4A, the sequence of past interaction 410 begins with "0 0 0 0 1 0 0 2," which indicates no action taken on days 1-4, a phone call to the customer on day 5, no action on days 6 and 7, and a letter or e-mail to the customer on day 8. Similarly, the sequence reports a text message on day 10, and an in-person meeting on day 12. In the illustrated example, the past interactions 410 are a sequence of actions that happened in the past year. This sequence can be combined with the donor and fundraiser information to be personalized. This donor and fundraiser information can be found in Table B and C in FIG. 4C.

The system 400 receives, as input 420, the correlated sequence of previous interactions 410. In illustrative embodiments, the system 400 may receive the correlated sequence of previous interactions 410 from a partner system (e.g., 105-1), or from the system's own knowledge of such past interactions. This action corresponds to step 252 of FIG. 2.

The system 400 then provides that correlated sequence of operations 410 to a reinforcement learning module 430. The reinforcement learning module 430 provides the correlated sequence of previous interactions 410 to a deep neural network 440. The information in Table A from FIG. 4C can be used as input to the Reinforcement Learning (RL) algorithm. RL is constantly interacting with an environment. This environment is designed to predict the probability of donation based on the information the Tables A, B and C from FIG. 4C. This probability can be converted into a reward for the RL algorithm.

The deep neural network 440 has been trained, a priori, to process such a sequence of previous interactions 410 to provide, as output to the reinforcement learning module 430, a set of future interactions 465. In preferred embodiments, the set of future interactions 450 includes a sequence of 365 future interactions 460, preferably to be executed in a series of one interaction per day for each day of a 365-day year (or, in the case of a leap year, 366 interactions). The future interactions may be defined according to the foregoing table. Other embodiments may have more or fewer than 365 (or 366) future interactions 460, however, as determined by a system user, for example depending on the time horizon of the user's needs and goals.

The state space in this problem is large. "State-space" is the 365 days with all the possible permutations of actions. That is why a Deep Reinforcement learning is being used. The algorithm for this process is similar to Asynchronous methods for deep reinforcement learning, although some tweaks can be implemented, as would be understood by a person skilled in the art in view of the present disclosures. This system has a policy that is generated by Recurrent Neural Networks and includes state-action pairs. This policy is interacting with a value function. A value function estimates the value of the existing policy. Based on the feedback that the network gets from the environment, the policy can be updated. This feedback can be in the form of gradient descent to the loss function. The loss function can measure the performance of model. It can include losses in values, policy, and entropy that can be interpreted as the error in each of these elements. "Entropy" is a method to control exploration vs exploitation. This can be done with the "epsilon greedy" method as well. Both methods can be used to avoid local minima in the gradient descent process.

The iteration in this model is working as follows. Given the past interactions the policy proposes a new action for tomorrow. This action will take feedback from environment and moves on to the next day. In the next iteration the policy knows the consequences of various actions and will start picking the actions by taking past experiences into consideration.

The model can iterate over and over until it satisfies multiple criteria (e.g., one or more threshold values). Examples of these criteria are the seasonality of the action (e.g., it may be better to send particular interactions during certain times of the year), the relation between the actions (e.g., certain actions may interrelate with each other), the threshold for the probability of donation, the targeted events and travels (e.g., various events and travel plans of the sender and/or the recipient may impact the model), etc. Once one or more of the criteria are satisfied, the model or plan can be updated and the appropriate interactions with the user and/or the recipient can be implemented.

The reinforcement learning module 430 then provides the sequence of future interactions 460 to a system user (e.g., a person responsible for executing those interactions, such as a sender). Some embodiments also draft communications from the sender to the customer, as disclosed herein. The actions in this paragraph and the previous five paragraphs correspond to one or more of steps 254, 256, and 258 of FIG. 2.

Preferred embodiments also use the sequence of future interactions 460 provided by the neural network 440 to update the neural network 440. To that end, in the embodiment of FIG. 4A, the reinforcement learning module 430 provides the sequence of future interactions 460 to an environment module 470.

The environment module 470 is configured to assess the sequence of future interactions 460 to determine a score, which score rates the likelihood that the sequence of future interactions 460, when executed, will result in a favorable response by the customer—e.g., in illustrative embodiments, a donation by a donor. In the context of fundraising scenario, the environment module 470 may be a model trained to predict the probability of closing gift. For example, the model can be an ensemble model such as a Random Forest or Gradient Boosting, or it can be a neural network, depending for example on the input data (e.g., unstructured or structured), and the amount of data available.

The score (probability) is then converted to a "reward." The score may be referred to as a "reward," and is provided to the reinforcement learning module 430. This conversion is based on a rewarding function. This rewarding function can use many different equations. A simple example is when the probability of donation is higher than a threshold, or when an action improves the probability of donation significantly, or when the system and suggested actions can hold a probability of donation in a certain range, or combination of all these—only then does the system gets a positive reward. Illustrative embodiments also include a negative rewarding system with similar opposing logic.

The reinforcement learning module 430, in turn, modifies the neural network 440 to bias the neural network 440 to provide output (i.e., each output is a sequence of future interactions 460) that increase the probability of a favorable response by the customer. To that end, in preferred embodiments the reinforcement learning module 430 adjusts the weights of the neural network. The actions in this paragraph and the previous three paragraphs correspond to step 260 of FIG. 2.

Figure 4B:
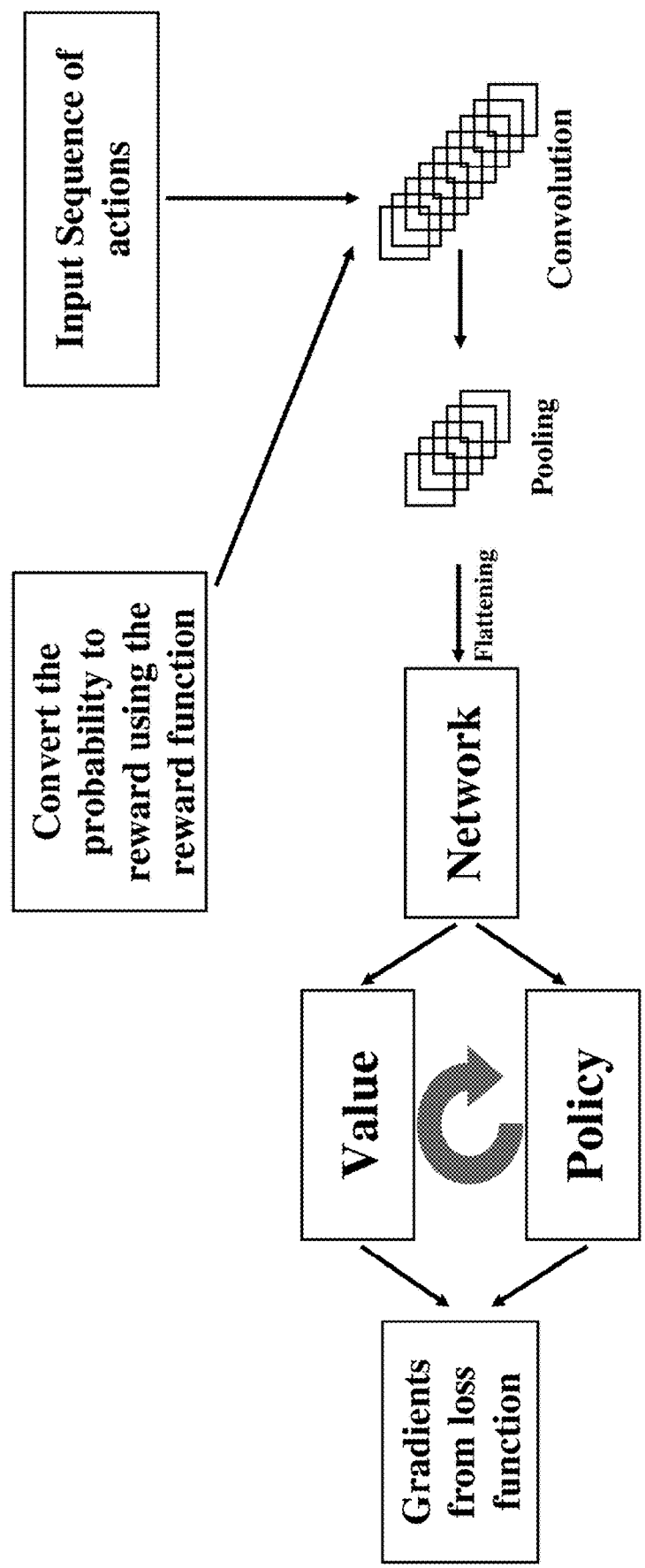
FIG. 4B is a schematic flow chart of an embodiment of a reinforcement learning process.

An example of an embodiment of the reinforcement learning process is provided below, in connection with FIG. 4B.

Starting from a state, the policy (e.g., embodiments in the neural network 440) will return an action, these state-actions will be evaluated with the value function and gradient of loss function will modify the policy network. In each step a set of current_state, actions, rewards, new_state, and values will be passed into the training loop. Rewards will be discounted based on the need and purpose of the algorithm. Discounting a reward means defining a balance between importance of future vs. short-term results. If we highly discount the rewards, the suggested actions will be focused on long-term pay off.

The sequence of actions will go to a convolutional hidden layer with multiple filters. Then using the max pooling technique, the information of different sections will be extracted, and the dimensions of the problem will reduce. Combining these different outputs and flattening them to an array will produce the input for the network. In illustrative embodiments, the network here is an actor-critic network, although it could also be another network that optimizes a sequence. This network is using a Recurrent Neural Network (RNN) to have information about both next and previous steps. The loss will be calculated based on the output of the RNN network and will be minimized throughout the learning process using gradient descent or any other error minimization algorithm.

Figure 4C:
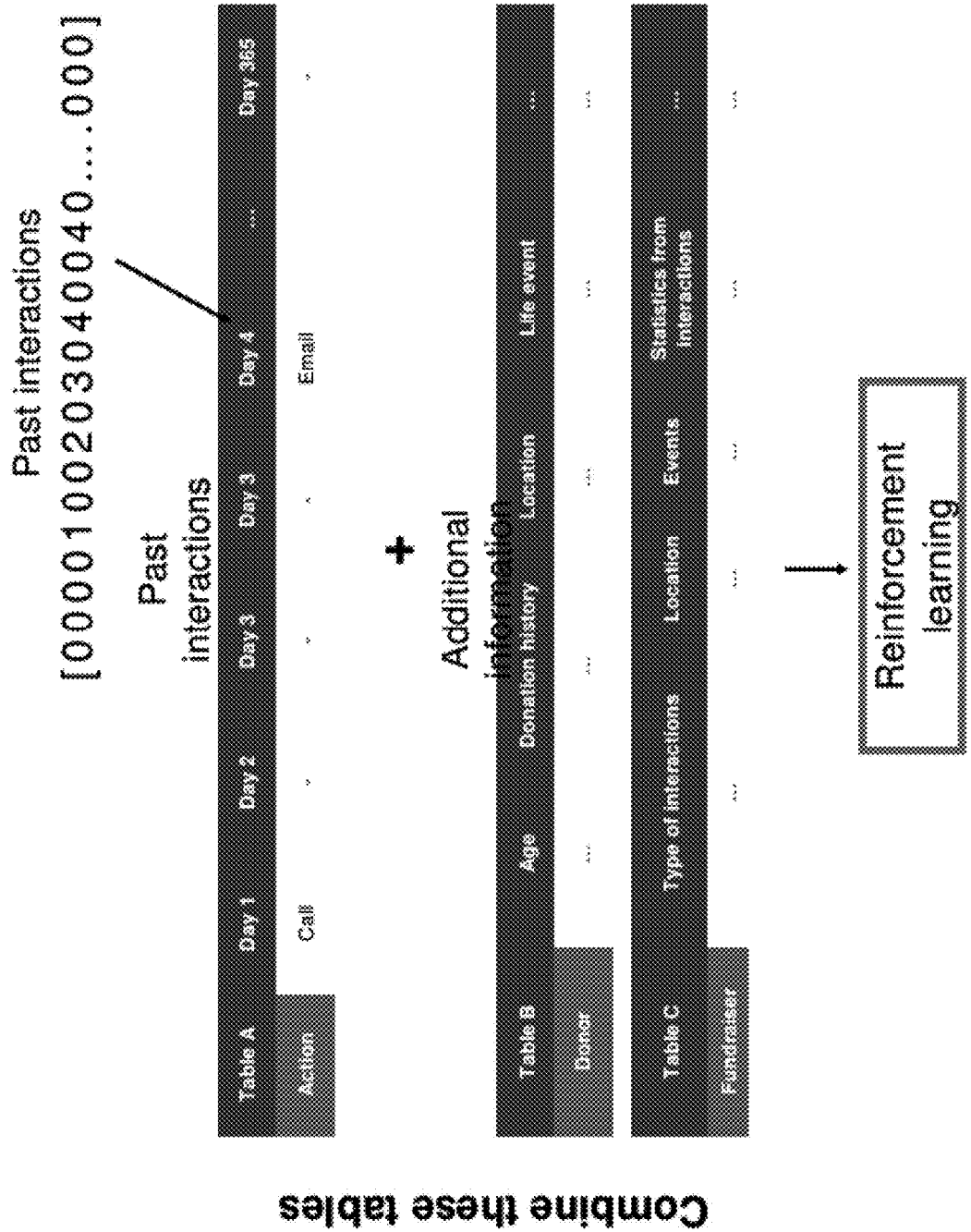
FIG. 4C schematically illustrates embodiments of tabular files of information used in operation of a system.

FIG. 4C schematically illustrates embodiments of tabular files of information used in operation of a system.

This figure schematically illustrates the interaction between the environment and the system. Each state has a probability of donation. This can be predicted by the existing data. Using the combination tables from Slide 2 with the addition of a Boolean column named "gift_closed" one can build a machine learning model that predicts the probability of closing a gift from a sequence of interaction. A decision tree can specify a threshold for each variable, split them based on this threshold, and grow a tree. Averaging the result of multiple decision trees will make an ensemble model that is more comprehensive and accurate. This can be done with a variety of methods such as Random Forest, Gradient boosting, etc.

This process can also be done with a Neural Networks if a Machine Learning algorithm is not accurate enough or cannot handle the input data. For instance, if the data contains unstructured text or if the amount of input data is above a certain number then using a Neural Network will be more efficient.

The output of this algorithm will be passed back to the RL model. In the next step, this probability will be translated as a reward to help the training process.

FIG. 4D schematically illustrates an embodiment of an environment module in communication with a reinforcement learning module.

This figure schematically illustrates the interaction between the environment and the system. Each state has a probability of donation. This can be predicted by the existing data. Using the combination tables from FIG. 4C with the addition of a Boolean column named "gift_closed" one can build a machine learning model that predicts the probability of closing a gift from a sequence of interaction. A decision tree can specify a threshold for each variable, split them based on this threshold, and grow a tree. Averaging the result of multiple decision trees will make an ensemble model that is more comprehensive and accurate. This can be done with a variety of methods such as Random Forest, Gradient boosting, etc.

This process can also be done with a Neural Networks if a Machine Learning algorithm is not accurate enough or cannot handle the input data. For instance, if the data contains unstructured text or if the amount of input data is above a certain number then using a Neural Network will be more efficient.

The output of this algorithm will be passed back to the reinforcement learning module 430. In the next step, this probability will be translated as a reward to help the training process.

Figure 4E:
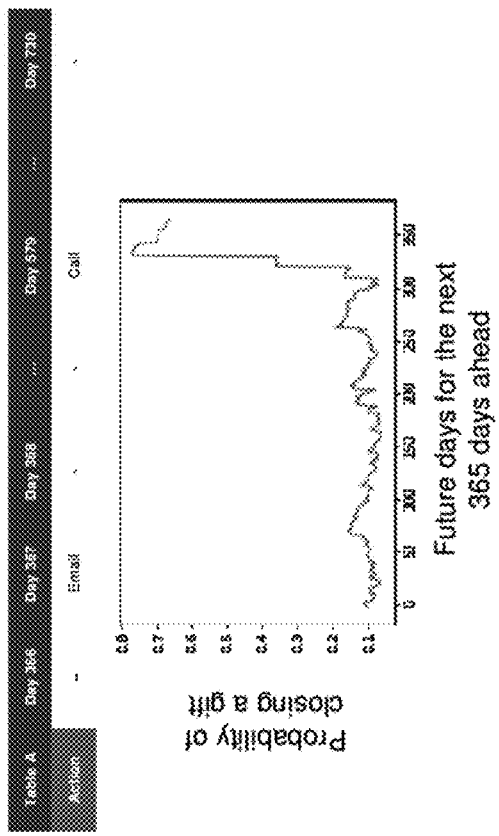
FIG. 4E schematically illustrates embodiments of a sequence of future interactions.

FIG. 4E schematically illustrates embodiments of a sequence of future interactions;

After the training is done and the loss of the model is minimized, the algorithm is ready to be used for prediction. Prediction itself is an iteration over the algorithm which is continuously modifying/improving the weights of the network and the policy.

This also has to satisfy the criteria that is necessary for the usage. For example, the sequence should at least have one high point of probability in the future. That point also can have a threshold to make sure that the relationship between the donor and fundraiser is at its best.

Some other criteria are making sure that the actions are sequential and relevant to each other and following the right common-sense logic (e.g. the fundraiser and donor cannot have a meeting without a previous leading interaction such as a phone call or email to prompt the interaction). Or, sometimes events and travel plans are predefined in the organizations and algorithm should take those into consideration as artificial barriers/boundaries that will adjust which sequences to take.

The output will have 365 days of future actions starting from tomorrow. If the fundraiser follows the algorithm recommendations, the probability of donation will look like the plot in this slide. There are interactions that are proposed to make and doing them will make the probability of interaction to be in a good stage in 330 days from today. This is a "lagging algorithm" in the sense that it will focus on the future outcomes. As mentioned prior, different reward functions or discount factors can be viewed as "leading algorithms" in the sense that they are precursors to an outcome and can influence the high probability of the outcome—a donation.

Figure 5A:
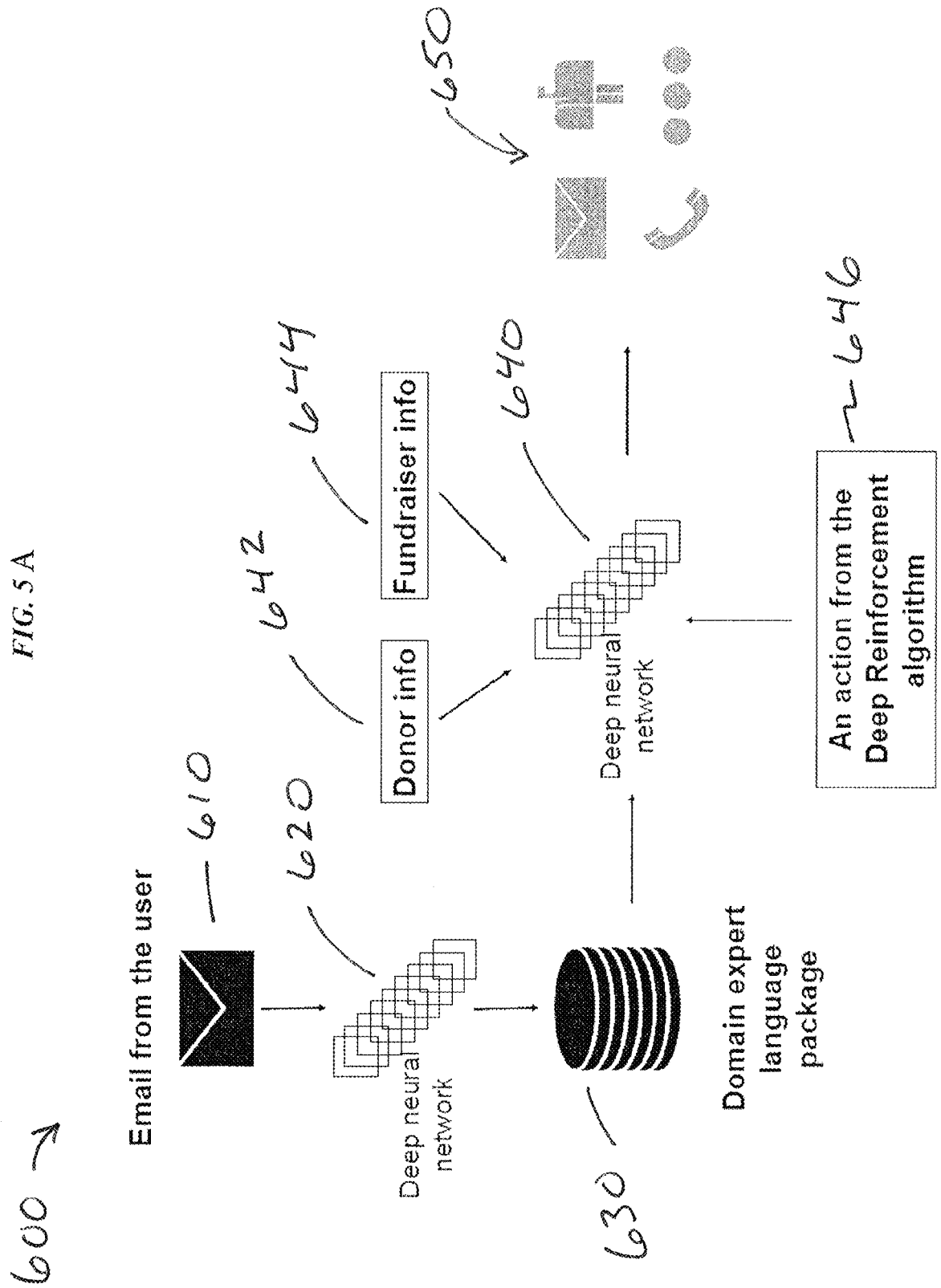
FIG. 5A is a schematic flow chart of one exemplary embodiment of how a neural network operates as part of the systems and methods provided for herein to generate a communication to a user or client.

FIG. 5A, supplemented by FIG. 5B and FIG. 5C, illustrates a system 600 in which information can be used by a deep neural network 620 (or a plurality of deep neural networks) to generate a suggested communication plan for the user/client, also referred to as the sender/fundraiser. The communication plan is then used by the user/client to communicate with the recipient/customer/potential donor.

As shown, a communication from a user can generate a chain of events. In the illustrated embodiment, the communication is an e-mail from a user 610, although any form of communication can start the chain of events. In the present context, the user is a sender/fundraiser, although in some embodiments, the user can be the recipient such that a recipient's communication is communicated directly to the deep neural network, without having to be sent by the user 610. In the illustrated embodiment, the e-mail from the user 610 can be a communication from the recipient that is forwarded to the deep neural network, or it can be a user-generated e-mail that relates to the recipient (e.g., information about the recipient, information about others having one or more criteria similar to the recipient, an environment, etc.).

The deep neural network 620 receives the e-mail from the user 610, and updates itself to reflect any information gleaned from the e-mail from the user. The updated deep neural network 620 then engages with a domain expert language package 630 to begin the process of generating a suggested communication. More specifically, the domain expert language package 630 can provide for a dictionary of the specifically targeted domain, words, ngrams (combination of words that are being used together), domain rules, grammar knowledge, the relation between the words and sentences, expert behavior and language usage, time relevance of the context, etc. A person skilled in the art, in view of the present disclosure, will understand how a domain expert language package can operate in this context.

After the domain expert language package 630 operates to help generate a communication, the result is again communicated to a deep neural network 640 (or plurality of deep neural networks). Additional information can be extracted and/or relied upon to update the communication and/or the deep neural network. That information can include, but is not limited to, donor information 642, fundraiser information 644, and an action from the deep reinforcement algorithm 646 as described above (including, but not limited to the description associated with FIG. 4A and FIG. 4B). The combination of this information can then lead to the building or generation of one or more of a revised communication plan and a communication to be sent to the recipient (collectively illustrated as communication 650), either by the system automatically or by way of first being reviewed by the user/sender/fundraiser. The domain expert language package 630 may also be updated during the process. For example, if an e-mail should be crafted as a result of the processing, the system can generate the context of the e-mail based on the knowledge of the domain expert language package, donor and fundraiser information, the timing and information from the deep reinforcement learning algorithm, among other information provided for herein or otherwise derivable in view of the present disclosure.

Computer Implementation

Figure 6:
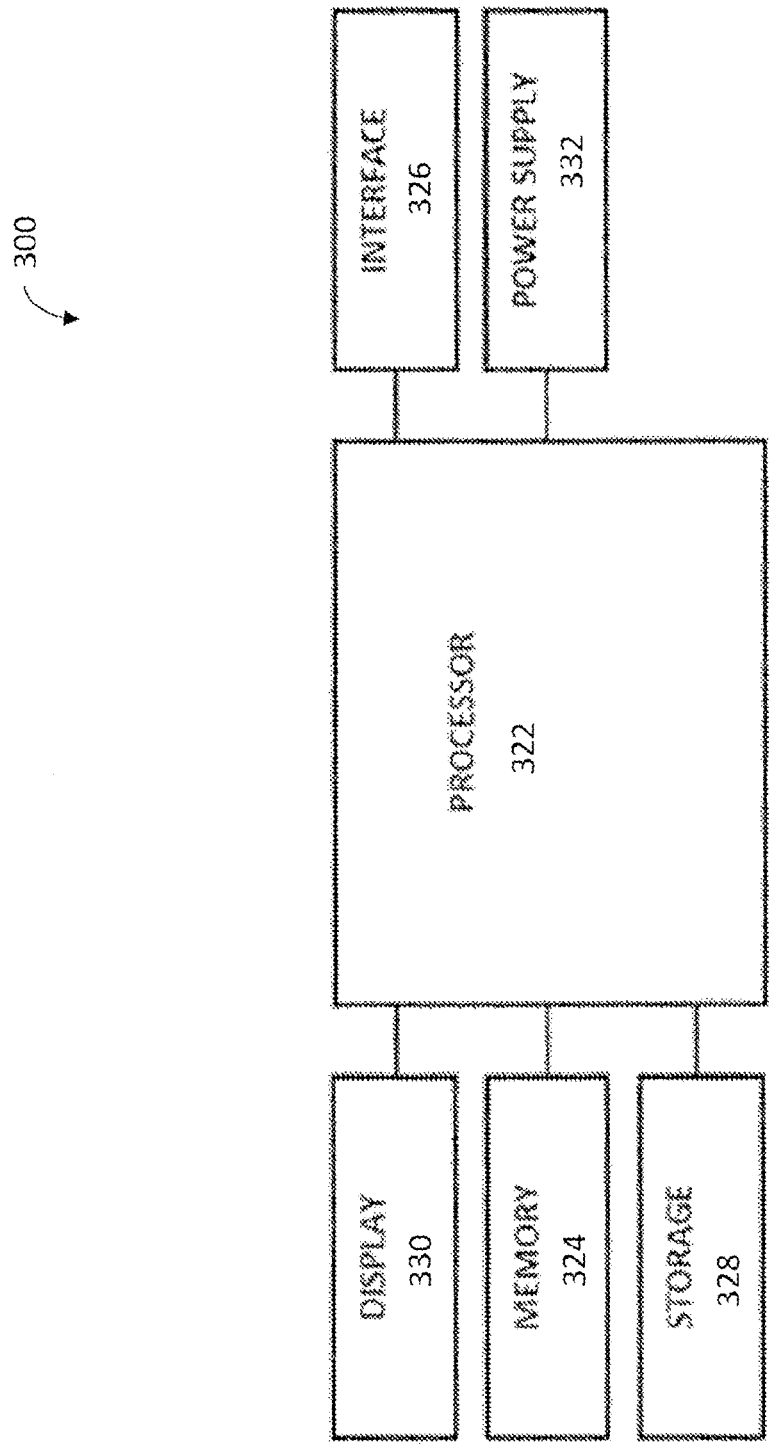
FIG. 6 is a schematic block diagram of physical components of one exemplary embodiment of a controller, or computer, for use in conjunction with various systems and methods provided for herein.

FIG. 6 illustrates a block diagram of the physical components of an exemplary embodiment of the controller, or computer, 300 that can include an intelligent communication management system 101 and/or execute the intelligent communication management system described herein. Although an exemplary computer 300 is depicted and described herein, it will be appreciated that this is for sake of generality and convenience. In other embodiments, the computer 300 may differ in architecture and operation from that shown and described here. The computer 300 can be a tablet computer, mobile device, smart device, wearable device, smart phone, laptop computer, desktop computer, cloud-based computer, server computer, multiple of the above, and so forth.

The illustrated computer 300 can include a processor 322 that controls the operation of the computer, for example, by executing embedded software, operating systems, device drivers, application programs, and so forth. The processor 322 can include any type of microprocessor or central processing unit (CPU), including programmable general-purpose or special-purpose processors and/or any of a variety of proprietary or commercially-available single or multi-processor systems. As used herein, the term processor can refer to microprocessors, microcontrollers, ASICs, FPGAs, PICs, processors that read and interpret program instructions from internal or external memory or registers, and so forth. The computer 300 can include a memory 324, which can provide temporary or permanent storage for code to be executed by the processor 322 or for data that is processed by the processor. The memory 324 can include read-only memory (ROM), flash memory, one or more varieties of random access memory (RAM), and/or a combination of memory technologies. The various components of the computer 300 can be interconnected via any one or more separate traces, physical busses, communication lines, etc.

The computer 300 can include an interface 326, such as a communication interface or an I/O interface. A communication interface can enable the computer 300 to communicate with remote devices (e.g., other controllers or computer systems) over a network or communications bus (e.g., a universal serial bus). An I/O interface can facilitate communication between one or more input devices, one or more output devices, and the various other components of the computer 300. For example, the interface 326 can communicate with the computer components of a second computer (e.g., an integrated radio of the second computer). Exemplary input devices include touch screens, mechanical buttons, keyboards, and pointing devices. Additional exemplary output devices include a projector, electronic display screens, and speakers. The computer 300 can include a storage device 328, which can include any conventional medium for storing data in a non-volatile and/or non-transient manner. The storage device 328 can thus hold data and/or instructions in a persistent state (i.e., the value is retained despite interruption of power to the computer 300). The storage device 328 can include one or more hard disk drives, flash drives, USB drives, optical drives, various media disks or cards, and/or any combination thereof and can be directly connected to the other components of the computer 300 or remotely connected thereto, such as through the communication interface. The computer 300 can include a display 330, and can generate images to be displayed thereon. In some embodiments, the display 330 can be a vacuum fluorescent display (VFD), an organic light-emitting diode (OLED) display, or a liquid crystal display (LCD). The computer 300 can include a power supply 332 and appropriate regulating and conditioning circuitry. Exemplary power supplies include batteries, such as polymer lithium ion batteries, or adapters for coupling the computer 300 to a DC or AC power source (e.g., a USB adapter or a wall adapter).

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A system for managing intelligent communications, comprising:
 at least one memory operable to store intelligent communication data and one or more predictive models; and
 at least one processor operable to:
  receive one or more data sets from one or more partner systems and/or one or more third party systems;
  update, based on the received one or more data sets, at least part of one or more of (1) the intelligent communication data, and (2) the one or more predictive models;

identify actionable communications based on the one or more predictive models;

generate intelligent communications corresponding to each of the identified actionable communications by one or more of artificial intelligence, machine learning, deep learning, and/or reinforcement learning, the generated intelligent communications including messages for transmission to one or more respective recipients by one of email, direct messaging, text messaging, and SMS, said messages being configured to allow one or more respective senders to transmit said messages to the one or more respective recipients without adding and/or altering any language in said messages, and said messages being at least one of tailored or personalized to each sender of the one or more senders, the intelligent communications being generated by personalizing language included in a template based on one or more of determinations and/or calculations of or by the predictive models, application of artificial intelligence, machine learning, a deep learning language model, deep referencing learning, or natural language processing techniques;

transmit the generated intelligent communications to each of the one or more respective senders; and identify improvement data based on tracking of the generated intelligent communications.

2. The system of claim 1, wherein the system is configured to receive one or more data sets according to a predefined schedule.

3. The system of claim 1, wherein the system is configured to receive one or more data sets in response to a request from the system.

4. The system of claim 1, wherein the system is configured to receive one or more data sets as a push from the one or more partner systems and/or one or more third-party systems.

5. The system of claim 1, wherein the system is configured to generate intelligent communications based on sentiment analysis.

6. The system of claim 5, wherein the sentiment analysis is generated by a Naïve Bayes model trained for familiarity.

7. The system of claim 1, wherein the system is configured to update at least part of one or more of (1) the intelligent communication data, and (2) the one or more predictive models by analyzing the one or more data sets by one or more of artificial intelligence, machine learning, deep learning, and/or reinforcement learning.

8. The system of claim 1, wherein the system is further configured to receive from a one of the one or more respective senders, an instruction to transmit a one of the generated intelligent communications, and to transmit said one of the generated intelligent communications to a corresponding one of the respective recipients.

9. A computer-implemented method of generating intelligent communications from an entity to a customer of the entity, the method comprising:

receiving, at a processor, one or more data sets from a partner systems and/or a third party system;

updating, based on the received one or more data sets, at least part of one or more of (1) the intelligent communication data, and (2) the one or more predictive models;

identifying actionable communications based on the one or more predictive models;

generating intelligent communications corresponding to each of the identified actionable communications by one or more of artificial intelligence, machine learning, deep learning, and/or reinforcement learning, the generated intelligent communications including messages for transmission to one or more respective recipients by one of email, direct messaging, text messaging, and SMS, said messages being configured to allow one or more respective senders to transmit said messages to the one or more respective recipients without adding and/or altering any language in said messages, the intelligent communications being generated by personalizing language included in a template based on one or more of determinations and/or calculations of or by the predictive models, application of artificial intelligence, machine learning, a deep learning language model, deep referencing learning, or natural language processing techniques; and transmitting the generated intelligent communications to each of the one or more respective senders.

10. The method of claim 9, further comprising identifying improvement data based on tracking of the generated intelligent communications.

11. The method of claim 9, further comprising, prior to transmitting the generated intelligent communications to each of the one or more respective senders:

receiving, from a one of the respective senders, edits to a one of the generated intelligent communications, and updating said one of the generated intelligent communications accordingly.

12. The method of claim 9, wherein generating intelligent communications corresponding to each of the identified actionable communications comprises generating intelligent communications based on sentiment analysis of one or more respective recipients.

13. The method of claim 9, wherein generating intelligent communications comprises generating messages that are at least one of tailored or personalized to each sender of the one or more senders.

* * * * *